S. H. COLWELL.
CONVEYING APPARATUS.
APPLICATION FILED NOV. 19, 1908.
915,413.
Patented Mar. 16, 1909.
2 SHEETS—SHEET 2.
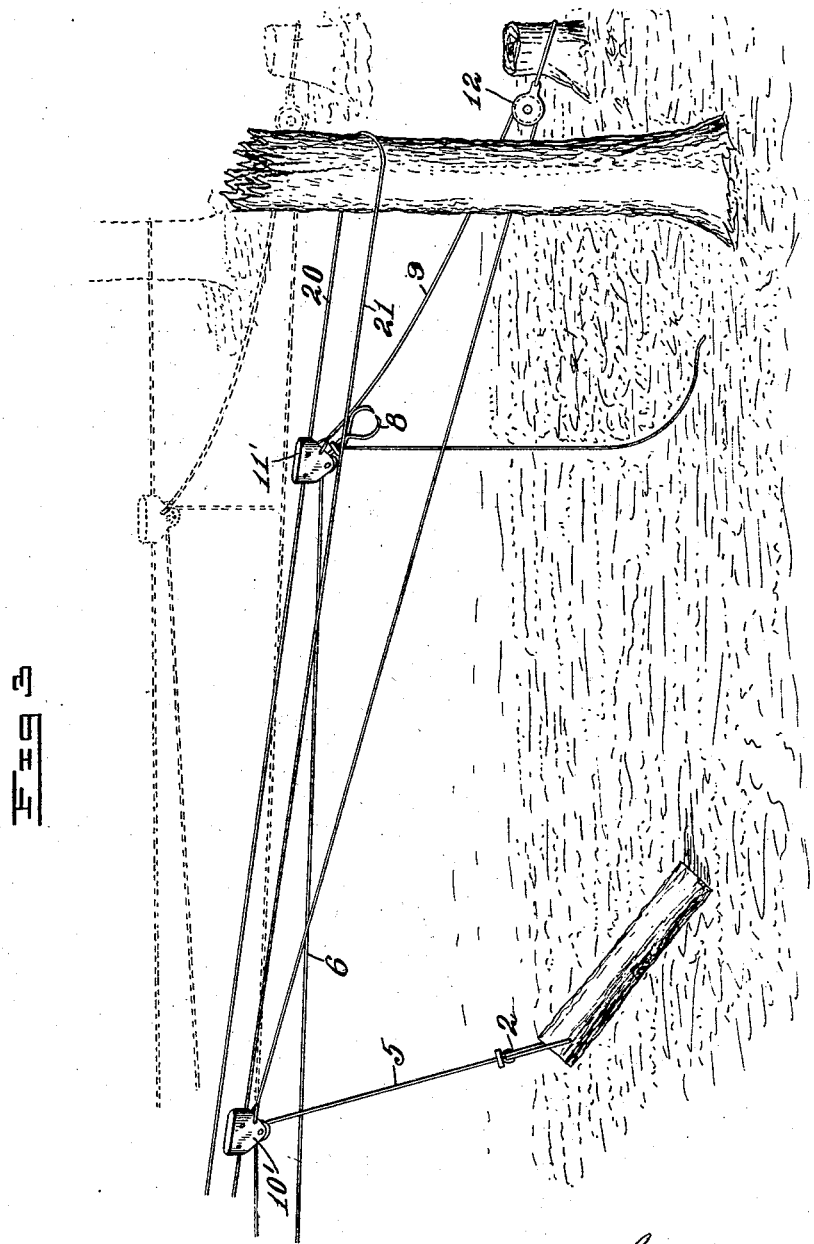

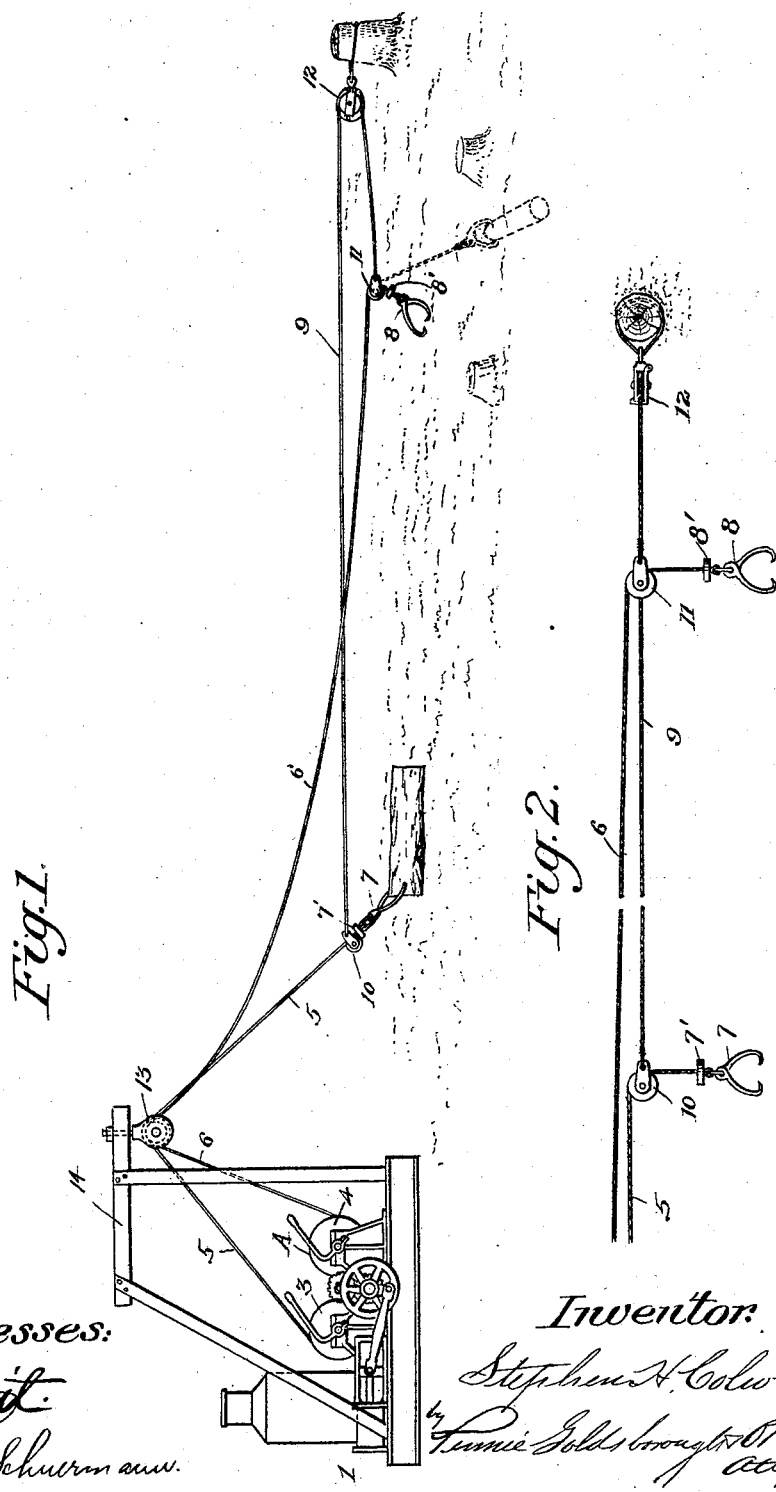

UNITED STATES PATENT OFFICE.

STEPHEN H. COLWELL, OF WALLACE, NORTH CAROLINA.

CONVEYING APPARATUS.

No. 915,413.  Specification of Letters Patent.  Patented March 16, 1909.

Application filed November 19, 1908. Serial No. 463,470.

*To all whom it may concern:*

Be it known that I, STEPHEN H. COLWELL, a citizen of the United States, residing at Wallace, county of Duplin, State of North Carolina, have invented certain new and useful Improvements in Conveying Apparatus; and I do hereby declare the following to be a full, clear, and exact description of the invention, such as will enable others skilled in the art to which it appertains to make and use the same.

My invention relates to cable conveyers for logs and the like and has for its object to provide a simple, inexpensive, durable and efficient apparatus by means of which logs, or other objects may be conveyed from any point at which they may be located to a selected place, without the necessity of bringing the logs or the like up to the line of the conveyer, thereby facilitating the gathering of the logs and materially lessening the time, expense and manual labor involved in systems heretofore in use.

In the accompanying drawings, Figure 1 is a perspective view of an apparatus involving my invention, applied as a log skidder or conveyer. Fig. 2 is an enlarged view of the cable arrangement. Fig. 3 shows the invention employed in connection with a trolley conveyer.

Referring to the drawings, 1 indicates a power plant capable of being moved from place to place, involving an engine and a boiler, and rope or cable winding drums 3 and 4, with the usual accessories which enable the drums to be operated simultaneous in opposite directions or either drum operated alone, or one drum to be held against movement while the other is operated, as is usual in plants of this general character.

The drum 3 is provided with a section of rope or cable 5, preferably of steel or the like, long enough to extend any required distance from the drum, and having on its free end a grapple or equivalent device 7 for engaging logs or other objects which are to be moved. The drum 4 is provided with a similar cable 6, which is similarly provided at its free end with a grapple 8 or the like. Each of the cable sections 5 and 6 are preferably run through a double guide sheave or pulley 13 mounted on a head support 14, which may be conveniently mounted on the platform or car which carries the power plant.

Heretofore it has been the practice in conveyer systems involving two opposite traveling cable sections, to run the cable through a tail block or sheave anchored at a distant point and to connect the opposite ends of the cable to two drums, so that, when the drums were operated to wind up one section and pay off the other section of cable, grapples, slings, carriages, or the like, which were attached to the two lengths or stretches of the cable between the head support and the tail block, moved toward the head support and the tail block, respectively, accordingly as they were on the "inhaul" or the "outhaul" section of the cable. By this means logs and other articles located along the cable-way or near the tail block anchorage might be engaged by a grapple or the like, and conveyed toward the power plant by the "inhaul", and, at the same time, another grapple would be drawn out by the "outhaul" toward the tail block. This arrangement, however, requires that the logs or other objects to be conveyed be brought to the tail block anchorage, or in line with the ingoing and outgoing cable sections. This necessitates much difficult and dangerous labor, particularly if the apparatus is employed for logging in heavy timber and underbrush, and, even under most favorable conditions, it is necessary to frequently shift the position of the tail block anchorage and therefore the line of travel of the cables to cover a given section or area of operation.

The present invention is especially intended to avoid the necessity of rolling or drawing the logs to the line of travel of the cables by independent means, and also to render frequent changes in the anchorage or location of the power plant unnecessary. To this end I provide an independent section of cable 9 sufficiently long to reach from the power plant to the tail block anchorage in a single length and this section I pass through the tail block 12, which for convenience is preferably a switch block or shackle block from which the cable 9 may be readily released when desired. On the free ends of the independent or supplementary cable section 9 are secured guides or runners 10 and 11, respectively, through which the cables 5 and 6 pass freely, as indicated in Fig. 2. These guides or runners may be of any desired character or form, such as rings, deadeyes, or the like, but for convenience they are preferably in the form of sheaves or pulley-blocks as indicated at 10 and 11.

When the stop 7' and 8' on cables 5 and 6, respectively, abut the blocks or guides 10 and 11, the cable sections 5, 6 and 9 constitute practically a continuous stretch from one drum 4 outward through tail block 12, thence back to drum 3. Therefore, if drum 3 be operated to wind up cable section 5, and drum 4 be allowed to pay off cable 6, a log engaged by grapple 7 will be drawn toward the machine, and the grapple 8 on the end of cables 6 will be carried outward toward the tail block to engage another log, after which cable 6 is taken in and cable 5 is paid out, as will be understood. During this species of operation the grapples 7 and 8 travel backward and forward in opposite directions and cable 9 runs through tail-block 12 first in one direction and then in the other, the operation as a whole being similar to that of an ordinary double length cable running from one drum out through a tail-block thence back to another drum, with grapples attached intermediate the lengths of the reaches of the cable. This mode of operation applies however only to cases in which the logs or the like are in substantially a direct line between the power plant and the tail block anchorage, so as to be engaged by the grapples 7 or 8. In all cases wherein the logs are at a distance from the line of the cables, or from the tail block anchorage, the present invention finds its particularly advantageous and economical application. Assume, for example, that a number of logs are located in the woods to one side of the direct line between the power plant 1 and the tail block 12 and at varying distances, up to, say, 200 feet from said direct line, the particular arrangement and coöperation of the elements constituting my improved conveyer system will permit each and every log to be dragged, drawn or conveyed first from its distant position into the direct line of the cable system and thence along said line to the power plant or other ultimate point of deposit. Take for example the log indicated in dotted lines at the right of Fig. 1, which is too far away to be engaged by a grapple on the ordinary rope or cable conveyer, in order to haul said log from its position to the desired place of deposit, it is only necessary to drag grapple 8 to the log as it lies, at the same time pulling cable 6 through the runner or guide sheave 11; the grapple 8 is then made fast to the log and, cable sections 5 and 9 being kept taut, cable 6 is taken in by drum 4, with the result that the log is drawn toward the cable line until the stop 8' engages pulley block 11, after which drum 3 is freed to pay off cable 5 substantially as fast as cable 6 is taken in by drum 4, with the result that grapple 8 and its attached log are drawn toward the drums and grapple 7 on the end of cable 5 is drawn outward toward the tail block. If during the travel of the log toward the direct line of the cables said log should encounter an obstacle, such as a stump or a rock, which would prevent its direct advance, it may be diverted laterally sufficiently to clear the obstruction by hauling in the taut cable 5 by means of drum 3, which would have the effect of moving block 11 toward the tail block 12 until the line of strain or pull on cable 6 between the block 11 and grapple 8, assumes a position to drag the log to one side of the obstruction, after which, the inward movement of cable 5 is arrested, and the taking in of cable 6 is resumed. As both cable sections 5 and 6 are provided with grapples, it will be apparent that the operations just described may be carried out with each cable alternately and the work may be performed in approximately one half the time required when but a single grapple is employed, and furthermore, the logs may be taken by the grapples at the points where they have been cut, thus avoiding the necessity of bringing them, by other means, to the line of the cables between the drums and the tail block anchorage. Furthermore, by providing the cables 5 and 6 with suitable clips, which may pass through the guides 10 and 11, additional grapples or the like may be attached to each of said cables to draw in a number of logs, as will be apparent. Again, by anchoring the tail block to an elevated support and maintaining the cables taut during the inhaul, the system may be employed as an elevated carrier by which the logs and the like are conveyed above and out of contact with the ground and any intervening obstructions.

In the modification of the invention as illustrated in Fig. 3, it will be observed that the same relation of cables 5 and 6 and auxiliary cable 9 is preserved as in Figs. 1 and 2, and the only change necessary to convert the system into an elevated carrier is the provision of two relatively taut cable sections 20 and 21, which are suspended at a distance above the ground from elevated supports, as for example, two trees or masts which cable sections 20 and 21 serve as supports or tracks for trolleys 10' and 11' respectively, the lower ends of which trolleys are provided with guides or sheaves which take the place of the guides or sheaves 10 and 11 illustrated in Fig. 1. The operation of this modified system differs from that first described only in the fact that the logs or other objects to be conveyed are lifted from the ground and carried in suspended relation by the trolleys or carriages 10' and 11', as will be apparent. If desired the two sections of the cable 20 and 21 may be separated so that the outer end of each section is connected to a separate support while the inner ends adjacent the power plant or the point of deposit are preferably connected to a single elevated support.

What I claim is:—

1. A conveyer system, comprising two cable sections having grapples or the like at the free ends thereof, means for taking up and paying out said sections, a third cable section running freely out a fixed guide, and guides on the ends of said third cable section through which the respective first mentioned cable sections run freely and by means of which the grapple ends of the first mentioned cables are prevented from disengaging the ends of the third cable.

2. A conveyer system, comprising two cable sections having object engaging means on their free ends, means for taking in and paying out said cable sections, a third cable section having sheaves or the like on its ends through which sheaves the respective first mentioned cable sections run freely, means to prevent the free ends of said first mentioned sections passing through said sheaves, and a fixed guide over which said third cable section runs.

3. A conveyer system, comprising two cable sections having object engaging means on their free ends, drums for taking in and paying out said cable sections, a third cable section having guides on the ends thereof through which the respective first mentioned cable sections run freely, means to prevent the free ends of said first mentioned sections passing through said guides, and a fixed tail block through which said third cable section runs.

4. A conveyer system comprising two elevated track ways, a trolley or carriage operating on each track way, each of said trolleys having a cable guide associated therewith, two cable sections having grapples or the like at the free ends thereof, said cable sections running freely through the guides on the trolleys, a third cable section connected at its ends to the respective trolleys, a fixed guide over which the said third cable section runs, and means to prevent the free ends of said first mentioned cable sections passing through the guides on the trolleys.

In testimony whereof I affix my signature, in presence of two witnesses.

STEPHEN H. COLWELL.

Witnesses:
THOMAS DURANT,
CHAS. J. O'NEILL.